(No Model.)
F. C. HOCKENSMITH.
AXLE.
No. 329,453. Patented Nov. 3, 1885.
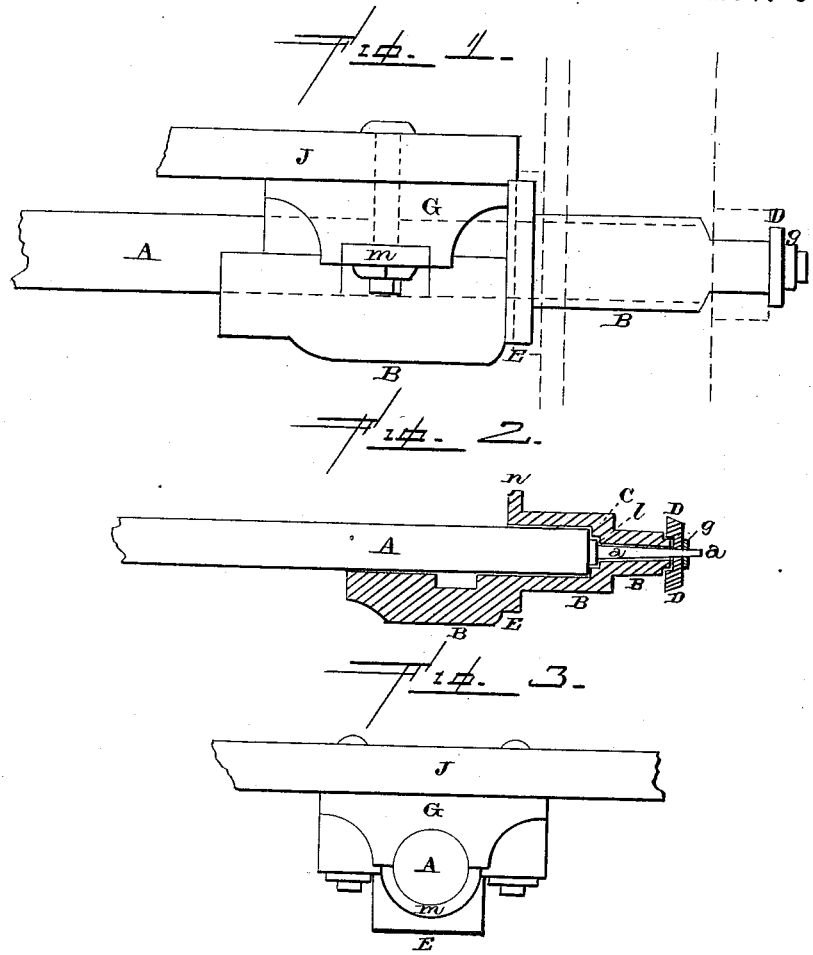
Witnesses.
L. F. Gardner
Jno. E. Prosperi
Inventor.
F. C. Hockensmith,
per F. A. Lehmann,
Atty.

UNITED STATES PATENT OFFICE.

FRANKLIN C. HOCKENSMITH, OF IRWIN'S STATION, PENNSYLVANIA.

AXLE.

SPECIFICATION forming part of Letters Patent No. 329,453, dated November 3, 1885.

Application filed April 22, 1885. Serial No. 163,085. (No model.)

*To all whom it may concern:*

Be it known that I, FRANKLIN C. HOCKENSMITH, a citizen of the United States, residing at Irwin's Station, in the county of Westmoreland and State of Pennsylvania, have invented certain new and useful Improvements in the Manner of Protecting Axles of Trucks or Mine-Wagons, of which the following is a specification, reference being had therein to the accompanying drawings.

My invention relates to an improvement in the manner of protecting the axles of trucks and wagons for mines against abrasion by the wheels; and it consists in a stationary cover placed over the axle, on which cover the wheel revolves, and also, in connection therewith, in a change in the form and length of the axle, as will be fully described hereinafter.

My object has been to invent a device for preventing the rapidly wearing away of the axles on trucks and mine-wagons, to avoid the necessity of frequently replacing them by new ones when worn out, and to make the necessary alteration in the axles now in use to suit the device, and to reduce the cost of their manufacture.

The making of axles of the usual form is expensive, and to save the cost I take the axles as they are cast in the furnace, straighten them, and without any additional labor employ them as they are.

The accompanying drawings represent my invention.

Figure 1 is a side view of the cover and axle; Fig. 2, a longitudinal section of the same. Fig. 3 represents an end view.

A represents the axle, which may be round or square, of uniform thickness from end to end, without collars, linchpin-holes, or shoulders. The ends of the axle are squarely cut off, and its length only exceeds by a few inches the width of the bed of the truck or wagon.

B is a stationary cover, its hollow interior corresponding with the shape of the axle, and, like a sleeve, is passed over the end of the axle, so as to intervene between the wheel and the axle to avoid contact. In the cavity of the cover into which the axle enters is a shoulder, C, against which the axle abuts. Beginning at the shoulder C, the cavity is diminished, and by a second shoulder, $l$, a chamber formed in which the head of a bolt, $a$, is confined, the shank of which passes through the narrowed end of the cover and protrudes from it. On the end of the shank the nut $g$ presses a collar, D, onto the end of the cover B to hold it in its place. The collar D also serves to prevent the wheel from sliding off from the cover. On the hollow cylindrical portion of the cover B on which the wheel turns, near the bed of the truck or wagon, is a collar, $n$, to guide the wheel. From the lower half of this collar $n$, at its inner side away from the wheel, the cover extends, and this extension E reaches toward the middle under the bed of the truck under the axle. In this portion E of the cover is a longitudinal cavity for the axle to pass, and a similar one in a hanger, G, bolted to the under side of the bed J. The cavities being the one above the other form together an opening for the axle. Recesses in the upper edges of the part E admit a clamp, $m$, that, being bent to fit the axle, passes under it from side to side, holds the cover in place and supports the axle. The clamp $m$ is let into the hanger G, and held by the bolts that confine the latter.

Having thus described my invention, I claim—

1. The cover B, in combination with the bolt $a$, washer D, and nut or key $g$, as described.
2. The cover B, formed with shoulders C and $l$, in combination with bolt $a$, washer D, and nut or key $g$, substantially as described.
3. The hanger G, clamp $m$, and axle A, combined substantially as shown and described.

In testimony whereof I affix my signature in presence of two witnesses.

FRANKLIN C. HOCKENSMITH.

Witnesses:
 LOUIS MOESER,
 F. A. LEHMANN.